US010708996B2

(12) United States Patent
Aliakseyeu et al.

(10) Patent No.: US 10,708,996 B2
(45) Date of Patent: Jul. 7, 2020

(54) SPATIAL LIGHT EFFECTS BASED ON LAMP LOCATION

(71) Applicant: SIGNIFY HOLDING B.V., Eindhoven (NL)

(72) Inventors: Dzmitry Viktorovich Aliakseyeu, Eindhoven (NL); Bartel Marinus Vab De Skuis, Eindhoven (NL); Dirk Valentinus Rene Engelen, Eindhoven (NL); Tim Dekker, Eindhoven (NL); Philip Steven Newton, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/753,504

(22) PCT Filed: Aug. 18, 2016

(86) PCT No.: PCT/EP2016/069634
§ 371 (c)(1),
(2) Date: Feb. 19, 2018

(87) PCT Pub. No.: WO2017/029368
PCT Pub. Date: Feb. 23, 2017

(65) Prior Publication Data
US 2018/0249554 A1 Aug. 30, 2018

(30) Foreign Application Priority Data
Aug. 20, 2015 (EP) ..................................... 15181664

(51) Int. Cl.
*H05B 47/105* (2020.01)
*H05B 47/19* (2020.01)
(Continued)

(52) U.S. Cl.
CPC ......... *H05B 47/105* (2020.01); *H05B 47/155* (2020.01); *H05B 47/175* (2020.01); *H05B 47/19* (2020.01)

(58) Field of Classification Search
CPC .......... F21K 9/232; F21K 9/235; F21K 9/238; F21V 23/0442; F21Y 2113/13;
(Continued)

(56) References Cited

U.S. PATENT DOCUMENTS 8,271,945 B2   9/2012   Eves et al.
9,677,755 B1*  6/2017   Linnell ............... F21V 33/0052
(Continued)

FOREIGN PATENT DOCUMENTS

CN   101093610 A   12/2007
CN   102017804 A    4/2011
(Continued)

*Primary Examiner* — Renan Luque
(74) *Attorney, Agent, or Firm* — Daniel J. Piotrowski

(57) ABSTRACT

A lighting system for providing a lighting scene in an environment occupied by a user, the system comprising:—a plurality of illumination sources, each source having a respective location sensor arranged to detect a location of the respective source relative to at least one point defined independently of the lighting scene and at least one of the sources further having at least one of an orientation sensor arranged to detect an orientation of the at least one source and a luminaire type sensor arranged to detect a type of the at least one source; and—a controller arranged to provide control signals to the plurality of sources in order to control the sources to render the lighting scene; wherein the controller is arranged to—determine an effect location of an illumination effect from the at least one source based on the detected location and at least one of the detected orientation and detected luminaire type of said at least one source and—adapt the control commands based on the detected source locations and the determined effect location for the at
(Continued)

least one source, thereby rendering the lighting scene relative to said at least one point.

15 Claims, 4 Drawing Sheets

(51) Int. Cl.
*H05B 47/155* (2020.01)
*H05B 47/175* (2020.01)

(58) Field of Classification Search
CPC ............ F21Y 2115/10; G06K 9/00604; G06T 2207/30201; G06T 7/74; H05B 33/0842; H05B 33/0845; H05B 33/0848; H05B 33/0854; H05B 33/086; H05B 33/0869; H05B 33/0872; H05B 33/0896; H05B 37/02; H05B 37/0218; H05B 37/0227; H05B 37/0245; H05B 37/0254; H05B 37/0272; H05B 37/029; Y02B 20/46
See application file for complete search history.

(56) References Cited

U.S. PATENT DOCUMENTS

| | | |
|---|---|---|
| 2003/0057884 A1 | 3/2003 | Dowling et al. |
| 2010/0191418 A1* | 7/2010 | Mimeault ............ B60Q 1/0023 701/36 |
| 2010/0262296 A1* | 10/2010 | Davis .................... G05B 15/02 700/275 |
| 2010/0277075 A1* | 11/2010 | Rees ...................... G01J 1/4204 315/149 |
| 2011/0035029 A1* | 2/2011 | Yianni ................. H05B 47/155 700/90 |
| 2011/0035404 A1 | 2/2011 | Morgan et al. |
| 2011/0140832 A1* | 6/2011 | Vinkenvleugel ....... H05B 47/19 340/4.2 |
| 2014/0132181 A1 | 5/2014 | Gerszberg |
| 2014/0320023 A1* | 10/2014 | Cannon .............. H05B 33/0854 315/153 |
| 2015/0145419 A1* | 5/2015 | Lashina ............ H05B 33/0872 315/153 |
| 2015/0342006 A1* | 11/2015 | Bosua ................ H05B 33/0845 315/153 |
| 2017/0205061 A1* | 7/2017 | Broers ............... H05B 37/0227 |

FOREIGN PATENT DOCUMENTS

| | | | |
|---|---|---|---|
| CN | 102119581 A | 7/2011 | |
| GB | 2440784 A | 2/2008 | |
| GB | 2499123 A | 8/2013 | |
| WO | 2013111134 A1 | 8/2013 | |
| WO | 2014001965 A1 | 1/2014 | |
| WO | WO-2014001965 A1 * | 1/2014 | ......... H05B 33/0872 |
| WO | 2014115048 A1 | 7/2014 | |
| WO | 2014181205 A2 | 11/2014 | |
| WO | 2015113833 A1 | 8/2015 | |

* cited by examiner

SPATIAL LIGHT EFFECTS BASED ON LAMP LOCATION

CROSS-REFERENCE TO PRIOR APPLICATIONS

This application is the U.S. National Phase application under 35 U.S.C. § 371 of International Application No. PCT/EP2016/069634, filed on Aug. 18, 2016 which claims the benefit of European Patent Application No. 15181664.2, filed on Aug. 20, 2015. These applications are hereby incorporated by reference herein.

TECHNICAL FIELD

The present disclosure relates to systems and methods for controlling lighting devices to render a lighting scene in an environment.

BACKGROUND

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user terminal such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of coloured lighting, dimming options and/or dynamic effects. In terms of control the most common approach is to replace a light switch with a smartphone based app that offers extended control over lighting (for example Philips hue, LIFX, etc.).

GB 2440784 A discloses a light patterning system consisting of one or more transportable nodes, which usually take the form of glow sticks or lights carried by individuals which may be caused to illuminate in a variety of different colours in response to command signals transmitted by a control system and/or by surrounding transportable nodes. The control system may include a plurality of fixed nodes to act as signal repeaters, to form part of the said control system or to act as an independent control system.

SUMMARY

Lighting systems which take into account luminaire positions when rendering a lighting scene are generally known. However, the inventors have recognised that it might be desirable if some effects were affected by a frame of reference other than the coordinate system in which the lighting scene itself is defined. For example, affected by the relative location of the user and light sources presented in the space, or by the position of the light sources relative to the globe (e.g. are they on the east of west side of the room), or by the position of light effects in the light scene relative to the position of light sources creating such light effects.

It is an object of the present invention to address one or more of the above-mentioned issues, or similar.

Hence, according to one aspect disclosed herein, there is provided a lighting system for providing a lighting scene in an environment occupied by a user comprising: a plurality of illumination sources, each respective one of the illumination sources having a respective location sensor arranged to detect a respective location of the respective illumination source relative to at least one point defined independently of the lighting scene; and a controller comprising one or more control units arranged to provide control signals to the plurality of illumination sources in order to control the illumination sources to render the lighting scene; wherein the controller is arranged to adapt the control commands based on the detected locations of the luminaires, thereby rendering the lighting scene relative to said at least one point. One of the illumination sources may have an orientation sensor arranged to detect a respective orientation of the respective illumination source and the controller may be further arranged to determine an effect location of the illumination created by the one illumination source based on its detected location and detected orientation, wherein the effect location may be further used to render the lighting scene.

In embodiments, said respective location of each respective illumination source is an absolute location relative to the earth.

In embodiments, said at least one point is specified implicitly by detecting a location of a device of said user.

In embodiments, said at least one point is specified explicitly by input provided by said user.

In embodiments, the lighting scene is specified by a description specifying different colours and/or intensities at different spatial positions throughout a region in said environment, and the sensor in each of the illumination sources is arranged to detect the respective location within said region.

In embodiments, said lighting scene is a 3D lighting scene described by a 3D description, and the controller controls the illumination sources to render the scene based on receiving and processing the 3D description.

In embodiments, the location sensors detect a respective 3D location of the respective illumination source.

In embodiments, said 3D description is a 3D lighting design designed by the user.

In embodiments, said plurality of illumination sources comprise a plurality of portable and/or free-standing luminaires.

In embodiments, each respective one of the illumination sources additionally has at least one of: a respective orientation sensor arranged to detect a respective orientation of the respective illumination source; a respective distance sensor arranged to detect a respective distance of the respective illumination source; a luminaire type sensor arranged to detect a respective type of the respective illumination source; or a light sensor arranged to detect a respective light output of the respective illumination source. The orientation of the illumination source and/or type of luminaire can be important to determine a size, a shape, an orientation, a 3D distribution and/or an effect location of the illumination created by the illumination source.

In embodiments, said lighting scene is a static lighting scene.

In embodiments, said lighting scene is a dynamic lighting scene.

In embodiments, each illumination source is operable to transmit a central command to one or more neighbouring illumination sources to control the illumination properties of the one or more neighbouring illumination sources to generate the dynamic lighting scene.

According to another aspect disclosed herein, there is provided a computer implemented method of rendering a lighting scene in an environment occupied by a user comprising: accessing data defining the lighting scene to be rendered; independently of the defining of said lighting scene, receiving at a controller data defining a at least one point; and rendering the lighting scene relative to said at least one point, by mapping the lighting scene to the illumination effect of a plurality of illumination sources in the environment to thereby adapt control commands from the controller to the illumination source based on the location of the illumination sources in the environment.

According to another aspect disclosed herein, there is provided a computer program produce for controlling a lighting system to render a lighting scene in an environment occupied by a user, the computer program product comprising code embodied on a computer-readable storage medium and configured so as when run on one or more control units of the lighting system to perform operations of: accessing data defining the lighting scene to be rendered; independently of the defining of said lighting scene, receiving at a controller data defining a at least one point; and rendering the lighting scene relative to said at least one point, by mapping the lighting scene to the illumination effect of a plurality of illumination sources in the environment to thereby adapt control commands from the controller to the illumination source based on the location of the illumination sources in the environment.

In the following described embodiments, the system enables lighting scenes to be rendered from independently definable locations. That is, a lighting scene which the user wishes to implement might be better viewed from a specific location (e.g. a sunrise effect would be better implemented starting far away from the user, as a real sunrise begins at the horizon). In general, a user may wish to implement a specific lighting scene with respect to a location or locations. For example, a "forest fire" lighting effect may be confined to a specific part of a room, which the user may indicate using a personal device or dedicated beacons.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The present invention proposes a lighting system for creation of spatial static and/or dynamic lighting effects.

Within this system each individual lighting device has a sensor that detects the location of the light source relative to an effect area. Other sensed environmental properties (e.g. luminaire orientation, luminaire type, distance to effect surface, ambient light conditions, camera view on effect area etc.) that has an impact on the created light effect and are within the reach of a lighting device might also be used.

Figure 1:
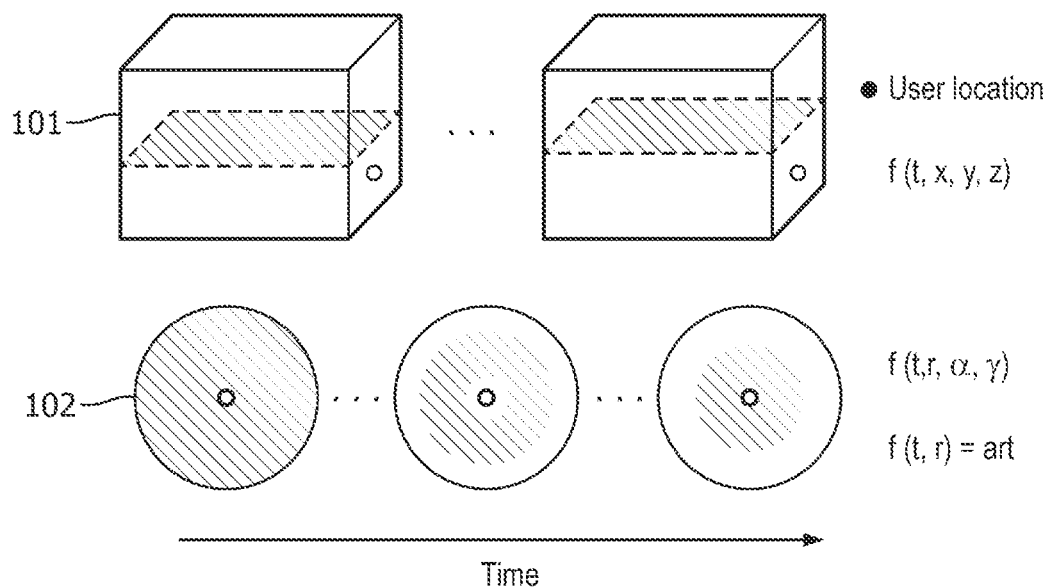
FIG. 1 is a schematic showing two examples of lighting scenes within an environment.

The commercial introduction of connected lighting that can be integrated with sensors and other devices is opening up new possibilities in creating static and dynamic light effects that were not possible with traditional lamp technologies FIG. 1 shows two examples of dynamic lighting scenes (also called lighting effects) within an environment. It is appreciated that this concept is also readily applicable to static lighting scenes (lighting scenes which do not change over time). In general, a lighting scene may be specified as a function of position and/or time. That is, the lighting scene specifies a colour (a combination of hue, saturation, and intensity) at each of a plurality of points in space which may (for dynamic scenes) vary over time.

A lighting scene may be either 3D or 2D and use any appropriate coordinate system (e.g. Cartesian, spherical, cylindrical etc.) to specify locations therein. A lighting scene may vary over time or not. A lighting scene may cover all points within an environment, or may only cover a spatial subsection within the environment. A lighting scene is defined by specifying a colour for each spatial point within the environment (and, if dynamic, how it changes with time). Each spatial point (or volume) may fall within the illumination area of one or more lights.

As shown in FIG. 1, a "sunrise" effect lighting scene 101 may, for example, be defined as a 3D volume that starts with all lights activated on the ground level, i.e. below or on the level of the user, and progresses over time to activating lights above a user (depending on lighting infrastructure, the system might activate each light based on the current colour of the closest pixel in the volume). The volume is defined by pixels, each of which can be associated with a light or more than one light, where illumination areas overlap. This scene behaviour can be specified as a function of position and time: f (t, x, y, z). The user position is shown at 103, the sunrise effect is seen from his perspective.

Also shown in FIG. 1, a "wave" effect lighting scene 102 can be defined using a spherical representation, where the user might be positioned in the centre 104. In this case it is possible to describe the lighting scene as a simple function where the colour of each pixel (light) is defined by the distance to the user (r) and time (t):f (t, r).

Figure 2:
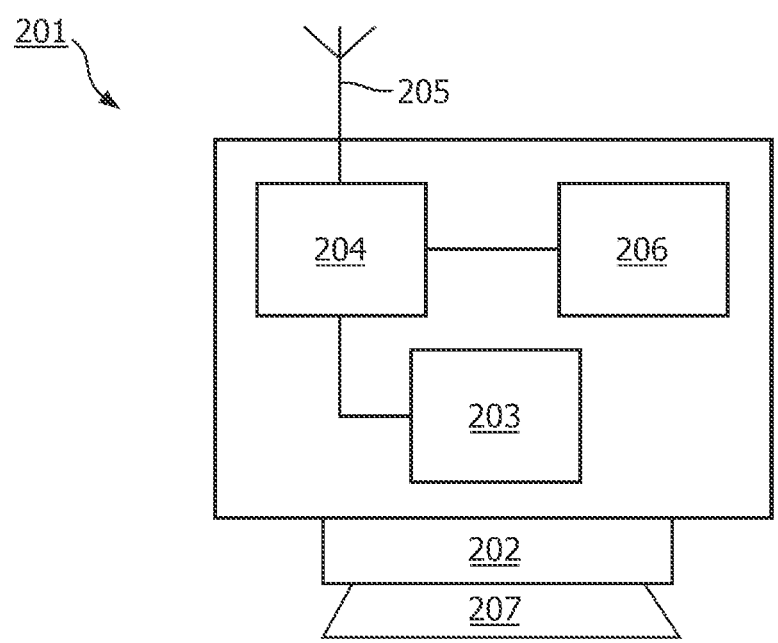
FIG. 2 is a schematic showing a lighting device.

Lights can be implemented as luminaires. FIG. 2 shows a schematic of a luminaire 201 according to the present invention. The luminaire comprises a light source 202, a driver 203, a logic unit 204, a communications unit 205, and a location sensor 206. The light source 202 is operatively coupled to the driver 203. The driver 203 is operatively coupled to the logic unit 204. The logic unit 204 is operatively coupled to the communications unit 205 and the location sensor 206.

The driver 203 supplies drive signals to the light source 202 for controlling a light output 207 generated by the light source 202. This light output may be a simple on/off, but the light source 202 may also be capable of generating a more sophisticated light output. For example, the light output may be controlled in terms of colour. As used herein, the term "colour" is understood to include the individual components of a colour. For example, hue, saturation, and intensity, though other colour components may be used such as chrominance and luminance. Hence, the driver 203 may control the individual colour components of the light output separately. Light sources capable of this type of control are known, e.g. Philips Hue.

The location sensor 206 is arranged to detect the location of the luminaire 201 with respect to a point. This may be achieved in a number of ways. For example, the sensor 206 could comprise a sensor for detecting beacon signals from anchor nodes of a dedicated indoor positioning network, e.g. RF, infrared or ultrasound beacon signals. In this case, the logic unit 204 may be configured to use the beacons to perform a positioning calculation such as a triangulation, trilateration, multilateration or fingerprinting process in order to detect coordinates of the luminaire 201, e.g. on a map or floor plan.

As another example, the logic unit 204 may perform a location calculation such as a triangulation, trilateration, multilateration or fingerprinting to calculate the coordinates of the luminaire 201 based on multiple RF signals such as Wi-Fi beacons or other Wi-Fi, ZigBee or Bluetooth signals from multiple different ones of the luminaires 201 and/or other such RF nodes, and then compare with known coordinates of the one or more others of the luminaires 201. As yet another example, a location calculation such as a triangulation, trilateration, multilateration or fingerprinting could be performed based on coded light signals from the fixed light sources, or based on signals from cell towers of a mobile cellular network such as a 3GPP network.

It will be appreciated that these are just examples, and various other localization technologies will be familiar to a person skilled in the art. Combinations of the above and/or other techniques could also be used to improve accuracy.

The communications unit may be implemented as either a wired or wireless connection for receiving control signals. In some embodiments the communications unit 205 may be a bi-directional communications unit allowing the luminaire 201 to receive and transmit signals. For example, this would allow the luminaire 201 to transmit location data to a central controller.

The logic unit may be implemented using a CPU or other processing means, and is arranged to control the driver 203 (and hence the light source 202) according to the received control signals. The logic unit 204 is also arranged to receive location data from the location sensor 206. In embodiments, the logic unit 204 is also arranged to receive orientation data from an orientation sensor.

Figure 3:
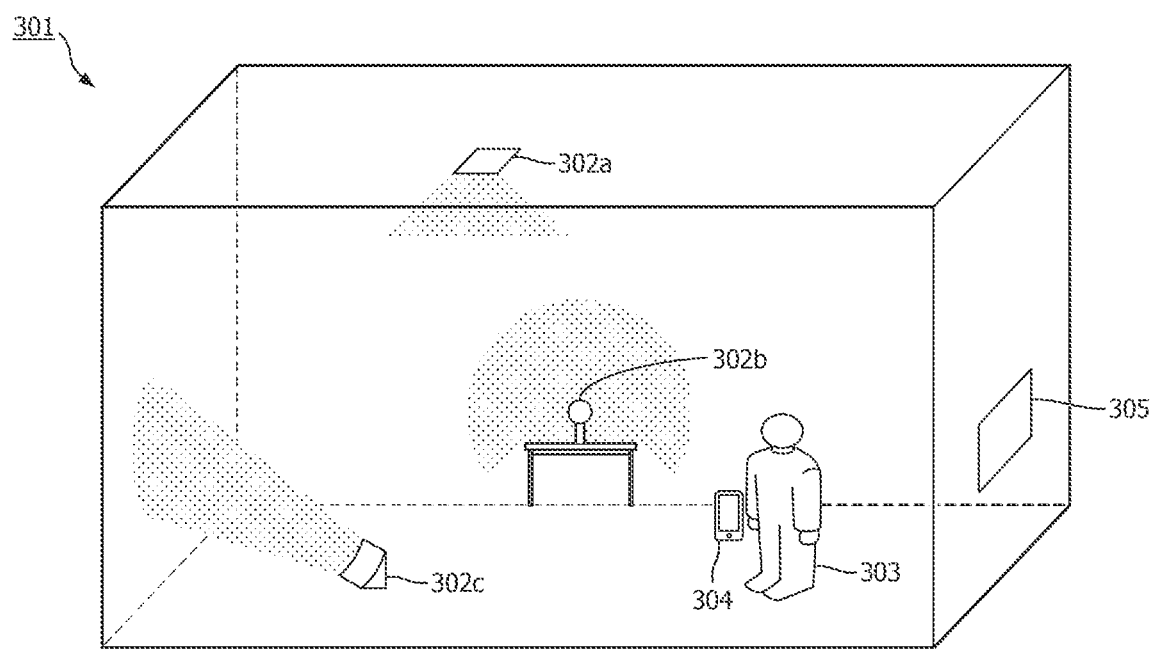
FIG. 3 illustrates an example environment in which the present invention may be installed.

FIG. 3 shows a lighting system according to the present invention deployed in an environment 301 such as a room or an office, though it is appreciated that the lighting system may be installed in any environment. The system comprises a controller and a plurality of luminaires 302*a*, 302*b*, 302*c*. Also shown is a user 303 within the environment.

The controller is arranged to provide control commands to the plurality of luminaires 302*a*, 302*b*, 302*c* in order to control the luminaires 302*a*, 302*b*, 302*c* to render a lighting scene. The controller may be implemented in, for example, a personal mobile device 304 of the user 303 but may also be implemented in a dedicated control device such as a wall-mounted control device 305. In embodiments, the controller may also be wholly or partially implemented in a distributed fashion. For example, part of the controller functionality may be implemented in the logic units of the luminaires.

Each luminaire present in the environment contributes to an overall lighting effect seen by the user 303. The light output from each luminaire 302*a*, 302*b*, 302*c*, in general, illuminates a different spatial region from the light output of others of the luminaires 302*a*, 302*b*, 302*c* (though it is appreciated that light outputs may overlap partially or entirely). For example, luminaire 302*c* is shown as a spot light directed towards a wall and hence illuminates substantially only an area on the wall. Light 302*b*, on the other hand, is shown as an ambient light with a diffuse light output which illuminates substantially all of the environment 301.

In embodiments, each luminaire 302*a*, 302*b*, 302*c* may include additional sensors. For example, luminaire 302*a* may only need location sensing, whereas luminaire 302*b* may require location and distance data, and luminaire 302*c* may require location, orientation and distance data. Note that not every luminaire 302*a*, 302*b*, 302*c* may benefit from inclusion of every type of sensor. Hence, it is not necessary that every luminaire 302*a*, 302*b*, 302*c* includes the same set of sensors. As used herein, the term "sensor" is used to describe any means by which a luminaire 302*a*, 302*b*, 302*c* may acquire information relating to a characteristic of the luminaire. For example, a sensor may detect the luminaire type (e.g. spot light, diffuse light etc.). Alternatively, the luminaire may be preconfigured with information relating to its type. Various types of sensor which may be employed in the luminaires 302*a*, 302*b*, 302*c* are described below.

A distance sensor may be included for detecting the distance of a surface from the luminaire 201. Such distance information, provided to the controller, can allow the controller to determine the location of an effect generated by the luminaire 201. For example, with an up-light luminaire, the distance sensor might provide information that would give the location of the effect relative to the luminaire. That is, the distance from the luminaire to the ceiling. This allows the controller to estimate the size of the effect (if the light output shape/spread angle is known, e.g. from the fixture type).

An orientation sensor may be included for detecting the orientation of the luminaire 302*a*, 302*b*, 302*c* by employing, for example, compasses and accelerometers. Orientation sensors are particularly important when the light output of the luminaire 302*a*, 302*b*, 302*c* is significantly non-isotropic. For example, by detecting the orientation of a spot light such as luminaire 302*c*, the direction illuminated by the light output is known. This is less important for an ambient or diffuse light which illuminates substantially equally in all directions. In further embodiments, this orientation data may be combined with distance data. For example, luminaire 302*c* may include both a distance sensor and an orientation sensor (in addition to the location sensor). This then allows the location of the effect generated by luminaire 302*c* to be determined by the controller.

Each luminaire may be preconfigured with luminaire type (e.g. fixture type, bulb type) information, may include a luminaire type senor to detect the luminaire type, or may be provided by the user. In the case of a connected luminaire (e.g. Philips Hue Beyond, Hue Go, etc.) the luminaire can provide this information to the light controller. In any case, knowing the type of luminaire can be important to determine a size, shape, orientation, 3D distribution and/or effect location of the illumination created by the illumination source. For example, a luminaire including a Philips E27 Hue bulb with a dark shade will create a very different effect from a similar luminaire in which the bulb is open (not shaded).

A light sensor may be included for detecting the light effect of the luminaire and/or other luminaires present in the environment. For example, a light sensor in the luminaire may detect the colour and/or intensity of the effect area. This information may allow the controller to infer the effect area of the luminaire. As a specific example, a lighting scene implemented by a plurality of luminaires may consist of a "red" illumination throughout a room with a single corner of "yellow". In this case, it can be inferred that a luminaire with a light sensor detecting "yellow" provides a lighting effect in said single corner. Hence, in addition to knowing the location of the luminaire itself, the location of that luminaire's lighting effect is then known.

Another way in which a light sensor may be used may be for compensating for a poorly calibrated or un-calibrated light output. For example, the controller may control a given luminaire based on the sensed location to contribute appropriately to the rendering of a scene. However, if the luminaire actually outputs only e.g. half the desired output power, then this can be detected by a light sensor and appropriately compensated for by the luminaire or controller. That is, the light sensor may provide a feedback.

Generally, increasing the number of different sensors embedded in a given luminaire can improve the localization of the light effect of that luminaire, but for some types of light sources just having location data can be enough (e.g. as sensed by ZigBee based localisation).

Figure 4:
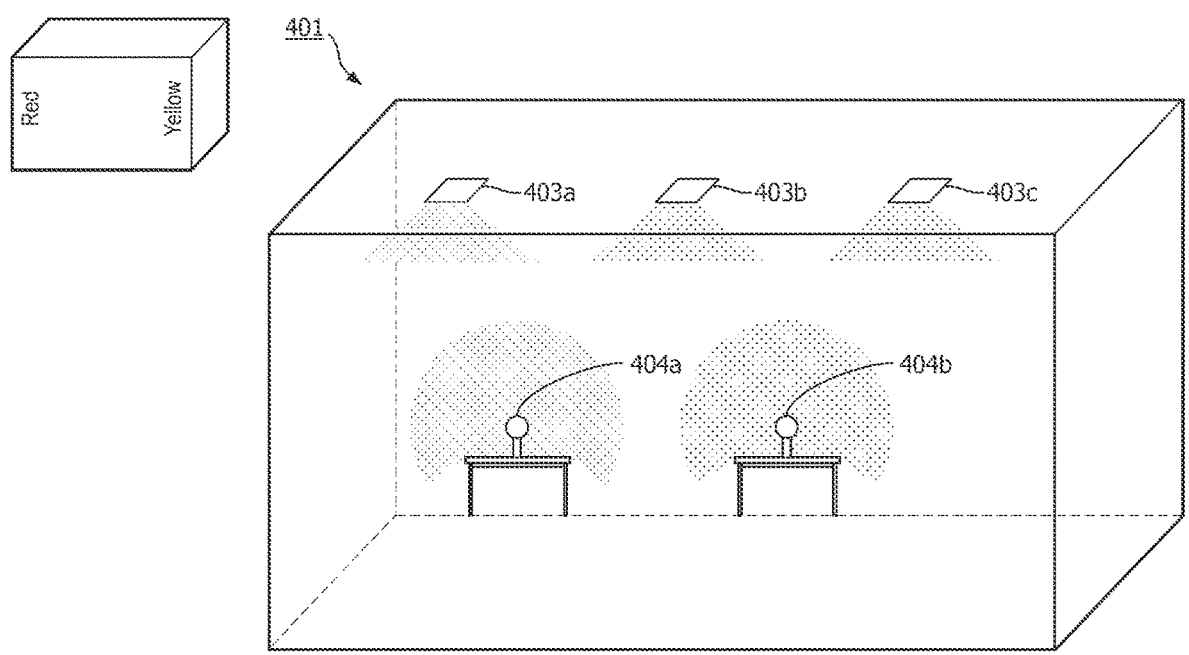
FIG. 4 shows an example lighting scene and its rendering within a room.

FIG. 4 illustrates how a lighting system may implement an example lighting scene 402 in a room 401. As described above in relation to FIG. 1, a lighting scene specifies a colour for each spatial point within the environment. For clarity, FIG. 4 shows only a single example of a static lighting scene, though it is appreciated that the concept applies also to dynamic lighting scenes. The room 401 includes three ceiling-mounted luminaires 403a, 403b, 403c and two free-standing luminaires 404a, 404b, though it is appreciated that the concepts described herein are applicable to any number of luminaires.

The example lighting scene 402 consists of red on one side of the room 401 (left) fading to yellow on the other (right), shown in greyscale. Hence, the lighting scene 402 is defined by mapping a location (volume) within the room 401 to a colour value. For example, all locations on the left wall of the room 401 map to the colour "red" and all locations on the right wall map to the colour "yellow". Locations between these two walls map to colours falling on a continuum between red and yellow, with those locations closer to the left being more "red" and those locations on the right being more "yellow". Details as to how light scenes are created are given later.

To render the lighting scene 402, the controller uses the respective locations of each luminaire 403a, 403b, 403c, 404a, 404b (as sensed by the respective location sensors 206) to determine, using the mapping of the lighting scene 402, the appropriate colour value. The respective driver 203 of each respective luminaire then drives the respective light source 202 to create the appropriate light output for that luminaire. Hence, in the example shown in FIG. 4, the five lights present render the red-yellow fading effect of the lighting scene 401.

Figure 5:
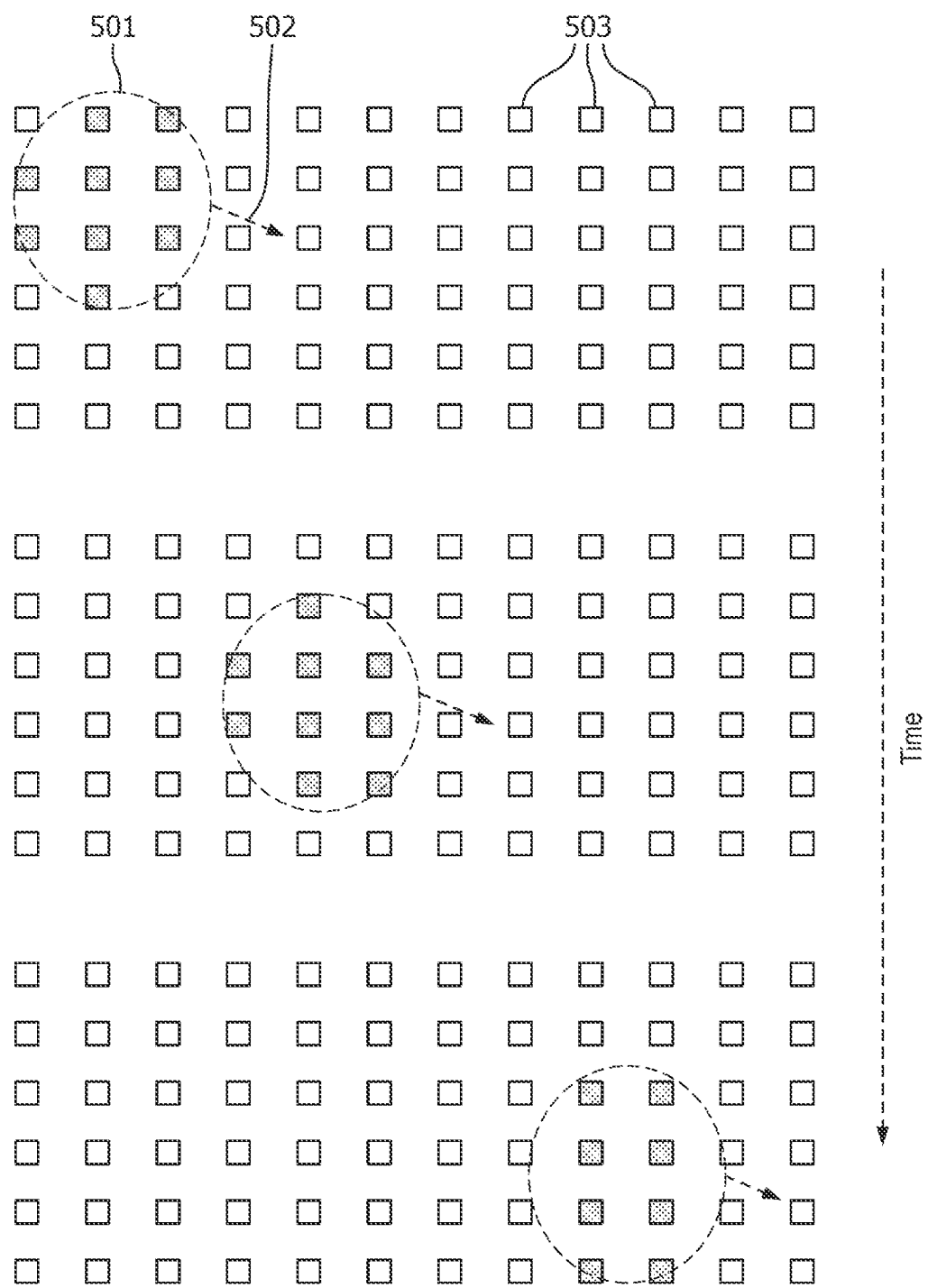
FIG. 5 illustrates a 2D example of a more complex lighting scene.

FIG. 5 illustrates schematically how a plurality of luminaires 503 may be used to render a more complex lighting scene. A 2D representation is shown for clarity, but it is appreciated that the same concepts apply generally also to a 3D lighting scene.

The lighting scene as illustrated in FIG. 5 consists of a "red" area 501 moving within the environment according to motion vector 502. Hence, all points within the red area 501 are mapped to "red" colour and all points outside the red area 501 are mapped to a different colour (which may be "off"). There are different ways in which such a scene can be created: (1) the scene might be created by an expert in a way similar to creation of a 3D video clip or the way content for volumetric 3D displays is created (e.g. using any 3D game engines), (2) the scene might be defined by a simple function that will define the change of light parameters over time, (3) the scene can be created by "stacking" 2D images (video frames) onto each other, effectively creating a 3D colour volume, the dynamic aspect can be added as a reshuffling or modification of these 2D layers.

However the scene is defined, as the red area 501 moves through the environment, the controller is able to determine which luminaires 503 correspond to locations "inside" the red area 501 and which luminaires 503 correspond to locations "outside" the red area 501. Hence, the controller is able to adapt the control signals to control the plurality of luminaires 503 to each output the appropriate colour.

In some embodiments, each luminaire communicates its location as determined by its location sensor to the controller. Other information such as the luminaires' height (distance above floor), orientation, lamp/beam type, capabilities and other sensed parameters may also be communicated to the controller. When a user selects a specific dynamic light scene, she needs to specify if the effect should be rendered relative to the user location (which for example can be defined by the location of the wearable device or a smart phone) or relative to some other location that user can explicitly indicate (e.g. by selecting a light source that should be in the centre of the effect). The system takes these parameters into account when rendering the effect as described in more detail below.

In general, the location referred to above may be regarded as a reference point (at least one) defined independently of the lighting scene. In this regard, the word "independently" means that the reference point is not a point in the scene itself, but rather can be set separately from the definition of the scene. Hence, the reference point is free to be moved throughout the environment. Indeed, the reference point may be outside the environment. The reference point may be specified by a user who is a different person from the creator of the scene. The reference point may be specified at a different time than the time at which the scene was defined or first rendered. The reference point may be specified by the user who is within the environment during the time the lighting scene is already being rendered. This user may specify the reference point explicitly (e.g. by selecting a luminaire whose location is to be the point, or by placing a dedicated "beacon" at the desired point etc.) or implicitly (e.g. it is the location of the user herself, or a personal device of the user may be used as the point). Additionally, the system may be configured to assume a location by default to use as the reference point.

In view of all the above, in the general case a dynamic lighting scene can be described as a 3D volume where each point has a specific time dependent colour and there is also a point defined independently of the lighting scene. Such a description might also include orientation relative to the space it will be rendered in or geography (e.g. for rendering natural effects such as sunrise). Alternatively the color change can be described as function of time and location relative to the user. The locations of light sources relative to the point is combined with the type, orientation and other inputs from the individual luminaires to render a dynamic, spatial light effect, where the light effect itself can be described in a similar terms i.e. temporal and spatial.

In embodiments, the lighting system may be implemented using a centralised approach. In these embodiments, the controller receives location/orientation/luminaire type information, lighting scene data, and the location of the point(s).

The location/orientation/luminaire type information is received from each luminaire 201 as detected by the respective sensor 206 of each luminaire 201.

The lighting scene data may be stored locally in memory at the controller, or may be received via a wired or wireless communications interface of the controller from an external location (e.g. the internet). In either case, the user may select a desired lighting scene using a user interface (either implemented at the controller or on a personal device of the user).

The location of the point(s) with respect to which the scene is to be rendered may be received by the controller from an external location. For example, explicitly input by the user via an interface at the controller or via a personal device of the user, or implicitly specified as the current user location or the location(s) of dedicated beacon(s) placed within the environment. Alternatively, the controller may store a default point(s) in memory. For example, this default point may be the location of a previously used point.

The controller, having the location/orientation/luminaire type information as described above, is then able to provide the appropriate control signal to each luminaire as outlined below.

Note that at this point the lighting scene is merely an abstract representation of the desired illumination for the environment; the lighting scene may contain high spatial resolution details which the lighting system is not able to fully render. For example, the lighting system illustrated in FIG. 4 would not be able to accurately render a lighting scene containing, say, one hundred different colours. The addition of more luminaires may increase the accuracy of the rendering but, in general, the lighting scene will be an "ideal" representation of the desired illumination.

The location of the reference point(s) is used to orient the lighting scene. This means that the scene is transformed (e.g. rotated/mirrored) according to the location of the reference point. For example, the lighting scene in FIG. 4 may specify that the point is to indicate the location of the "red" wall. If the user chose to use his location as the point, in this example, the controller would then "flip" the lighting scene through the x-axis. Hence, this "oriented" lighting scene again specifies a colour value for each location within the environment, the difference being that the scene is now orientated relative to the point(s).

The oriented lighting scene (oriented relative to the point(s) as described above) is then used by the controller, in combination with the location/orientation/luminaire type information to determine the luminaire control signals. This may be achieved by taking a particular luminaire's location and determining the colour value at that location within the oriented lighting scene. The controller is then able to control that luminaire accordingly to output the appropriate colour. For some types of luminaire (e.g. spot lights) the controller must also take into account the orientation of the luminaire. This is because the location of the luminaire does not necessarily coincide with the location in which the light output is viewed (for example, a ceiling-mounted downward-facing spotlight generates a lighting effect on the floor below it, despite its location being in the ceiling). Hence, for these type of luminaires, the controller would not determine the colour value at the luminaires location. Rather, the controller would determine the colour value at the effect location (the location in which the effect is generated).

An alternative to the above-described arrangement is for the controller to determine the oriented lighting scene and transmit this to each luminaire. In this case, the luminaires would not need to transmit their location/orientation/type information to the controller and instead each luminaire would receive the oriented lighting scene data and the respective logic unit for each luminaire would determine the appropriate light output (in the same manner as described above in relation to the controller).

In order to render dynamic spatial scenes the controller needs to know the relative location of each luminaire relative to the reference point, moreover for some types of light sources the orientation is also important (e.g. a spot light). In a basic embodiment, the sensor 206 might detect the relative location of the luminaires 201 using Zigbee signal strength and type of the luminaire 201 can be communicated by the luminaire 201 to the controller. The user can then manually specify if the effect should be rendered relative to the user location (for example can be defined by the location of a wearable device or of a mobile user device such as a smart phone or tablet carried about the user's person) or relative to some fixed location that the user can explicitly indicate, e.g. by selecting a light source that should be in the centre of the effect. In this case the controller can place each luminaire in a 3D coordinate system, and then the lighting scene describe volumes with light properties (RGB value or range) that appear to travel through space. When the volume intersects with the coordinates of the luminaire, the luminaire receives the RGB value in a control command from the controller. Note again that the lighting scene is an abstract representation of the desired illumination for the environment. Hence, the lighting scene itself occupies a "virtual" environment in which detail may be arbitrarily high and colour placement/motion is not confined in any way (c.f. the "real" environment in which the lighting scene is to be rendered is limited to the rendering capabilities of the luminaires present). In the above case, the volume is an idealised model present within the lighting scene. For example, the lighting scene may be specified using 3D game graphics in which a 3D "ball" moves throughout the virtual environment. The lighting scene in the "real" environment then generates a rendering of this virtual environment.

It is also possible to define a graph, where every luminaire is a node and is connected to a few other luminaires. Sending an RGB value to a luminaire in a control command initiates the dynamic effect. The RGB value can in turn be transmitted to neighbouring nodes from the initiating luminaire, rather than from the central controller, in a manner comparable with neural networks. It is then possible to create the connections based on the location of lighting effects, and to annotate the connection with the direction between the lighting effects. By also giving the RGB value a direction, and matching this with the direction of the connections (e.g. vector multiplication), the system can determine the amount of RGB that goes to the next node.

In embodiments in which the controller is provided with more information about each luminaire (e.g. the orientation and the shape of the emission spectrum of the luminaires, or any other data provided by sensors as described above), the controller may be able to determine the location of the emission/effect generated by each luminaire (rather than just the location of the luminaire itself). This, in effect, allows the controller to use the location of the effect generated when determining the control signals. For example, a spot light may be physically located at a location which maps to a "red" area of the scene, but generates a lighting effect which is located in a "yellow" area of the scene. In this case, the controller is able to use the effect location, rather than the luminaire location, to control the luminaire to output "yellow", despite the fact that the luminaire itself is within a "red" region. This can be achieved by the controller by creating an overlay of the emission of each luminaire with the Zigbee range of the luminaire. This overlay gives the system information on where in the 3D space the light of a luminaire is created (i.e. the location in the environment which is illuminated by the light output of the luminaire). The received signal strength of the Zigbee signal together with the relative location of the lamps then becomes an indicator of the light created by a luminaire in the 3D space. The relative location of the luminaires is known in those areas where the Zigbee signals of at least three luminaires overlap. The orientation of a luminaire and thus the emission of the luminaire in 3D space can be determined using an orientation sensor in the luminaire.

An alternative to the above is for the controller to access environment configuration data (e.g. a 3D model of the environment), e.g. from memory, the internet, or as provided by the user. In this case, it is possible for the controller to determine the location of each luminaire's lighting effect/emission by considering the location of the luminaire within the environment. For example, a spot light would not require a distance sensor in this case as the distance from the spot light to the effected surface within the environment would be calculable (given orientation data). Methods of achieving this are known in the art.

Another alternative is for the effect location of each luminaire to be calibrated in a commissioning step. For example, by temporarily adding a camera to a luminaire would allow the luminaire's effect area to be directly observed. Alternatively, the user could use a camera (e.g. a camera of his mobile device) to calibrate the effects. This information can then be provided to the controller.

If the aforementioned moving volume enters the Zigbee ranges where the emission of the luminaire overlaps then that luminaire will be controlled to take on the RGB value indicated by the moving volume. When the emission of several luminaires overlap then the distance to the luminaire indicated by the Zigbee signal strength is used by the system to determine the relative brightness level required in each luminaire to create a desired light effect at that location.

Instead of Zigbee signal the system might be commissioned either during installation or before rendering the effect using coded light, where each luminaire can communicate its properties (in addition to coded light signal). If the system knows the orientation of the luminaires and the emission of the luminaires then using the signal strength of the coded light signal can provide the relative location of the luminaires and an estimation of the light effect in 3D space.

There are different ways how the controller may receive lighting scene data. In any case, a controller provides control signals to the plurality of luminaires to render the lighting scene. The controller may comprise a wired/wireless communications interface for receiving the lighting scene data from, for example, the internet; a lighting scene may then be rendered automatically, or upon input from a user via a user interface. Alternatively, the lighting scene may be explicitly input to the controller via a user interface by a user. Another alternative is for the light scene data to be stored locally on memory at the controller; the user is then able to select a lighting scene to render from memory.

There are different ways how each luminaire gets/sets desired light settings. Three possibilities are:

A central controller gathers input on location, orientation and illumination area properties of individual lighting devices and controls the luminaires based on this information to create desired spatial, dynamic light effects.

A central controller does not necessarily gather location/orientation/illumination area from the individual luminaires but instead the controller functionality may be distributed. That is, part of the controller functionality may be implemented in the logic unit of each luminaire. In this case, the controller may translate the desired lighting scene into a sequence of light settings and associated spatial conditions which it streams to all lighting devices. The individual lighting devices then activate the received light setting only when the lighting device meets the desired spatial conditions (e.g. spatial conditions: bedroom, east side, height<100 cm, light conditions: soft warm white, etc). In this case, a controller can also be an external lighting service, e.g. the user might tell all her bedroom luminaires to subscribe to a "sun rise" light content stream, and the luminaires will tune into this stream and only act if spatial conditions are met.

The controller functionality may be completely distributed in the logic unit(s) of the luminaire(s). In this case, each luminaire receives lighting scene data and independent point data and then adapts its light output based on its sensor data.

The ways in which independent point may be specified were outlined above and not repeated here.

With reference again to FIG. 1, the point is shown as the user location 103 (though it is appreciated, in light of the above disclose, that the point may be any arbitrary location). The location of this point within the environment affects the lighting scene. This allows many advantages over prior art lighting systems. For example, a sunrise effect is best rendered and viewed as the (lighting-implemented) "sunrise" beginning on the far side of the environment/room, to give a more realistic "horizon" view for the user. This is achieved by having the controller take in to account the user location as an extra input parameter (the point). That is, the controller can then determine the side of the room which is further from the user, and adapt the control signals accordingly to render the "sunrise" on that side.

Another example is illustrated in FIG. 1 as a wave effect. A user may wish to create a wave effect comprising inwardly/outwardly radiating circles. By introducing a point defined independently of the lighting scene itself, the present invention allows the user much more freedom. For example, the wave effect could be centered on the user regardless of where the user happens to be when she enacts the effect.

The user may interact with the lighting system in many ways. For example, the user may have a remote control device (e.g. a smartphone) on which the user creates a lighting scene or selects a pre-defined lighting scene (e.g. a sunset, fireworks, moving clouds etc). By localizing the remote control device on the moment of activating a lighting scene, this is used as an additional location reference point (the previously referred to "point") and the spatial rendering of the activated lighting scene is adapted to this reference location.

In a more advanced UI solutions, the user can also indicate in which direction the selected lighting effect should be created. For instance, the user can simply point her smartphone toward a particular direction or location where the light scene should be rendered, or where a spatial lighting effect should have its start or end point.

A more sophisticated and playful way to create spatial light effects would be the use of physical beacons which the user can place in the environment. For instance, the user can place two beacons in the room, then select a dynamic effect (e.g. forest fire) which will be rendered between those beacons, or move from beacon 1 towards beacon 2.

Optionally, further inputs and/or reference points can be used related to the user or social setting in the room. For example, the current location of the user, user input device, social setting etc. Aspects of the spatial lighting effect can then be adjusted to this (e.g. orientation, location, size, intensity of the effect).

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system for providing a lighting scene in an environment occupied by a user comprising:
   a plurality of illumination sources,
      each respective one of the illumination sources having a respective location sensor arranged to detect a respective location of the respective illumination source relative to at least one point defined independently of the lighting scene and
      at least one of the illumination sources further having at least one of an orientation sensor arranged to detect an orientation of the at least one illumination source, a luminaire type sensor arranged to detect a type of the at least one illumination source, and a distance sensor arranged to detect a distance of an effect surface of the lighting scene from the at least one illumination source; and
   a controller comprising one or more control units arranged to provide control signals to the plurality of illumination sources in order to control the illumination sources to render the lighting scene;
   wherein the controller is arranged to
      determine an effect location of an illumination effect from the at least one of the illumination sources based on the detected location and the detected distance of the effect surface from the at least one illumination source and at least one of the detected orientation and detected type of said at least one illumination source;
      adapt the control signals based on the detected illumination source locations and the determined effect location for the at least one illumination source, thereby rendering the lighting scene relative to said at least one point.

2. The lighting system of claim 1, wherein said respective location of each respective illumination source is an absolute location relative to the earth.

3. The lighting system of claim 1, wherein said at least one point is specified implicitly by detecting a location of a device of said user.

4. The lighting system of claim 1, wherein said at least one point is specified explicitly by input provided by said user.

5. The lighting system of claim 1, wherein the lighting scene is specified by a description specifying different colours and/or intensities at different spatial positions throughout a region in said environment, and the location sensor in each of the illumination sources is arranged to detect the respective location within said region.

6. The lighting system of claim 1, wherein said lighting scene is a 3D lighting scene described by a 3D description, and the controller controls the illumination sources to render the scene based on receiving and processing the 3D description.

7. The lighting system of claim 6, wherein the location sensors detect a respective 3D location of the respective illumination source.

8. The lighting system of claim 6, wherein said 3D description is a 3D lighting design designed by the user.

9. The lighting system of claim 1, wherein said plurality of illumination sources comprise a plurality of portable luminaires.

10. The lighting system of claim 1, wherein each respective one of the illumination sources additionally has at least one of:
    a respective orientation sensor arranged to detect a respective orientation of the respective illumination source;
    a respective distance sensor arranged to detect a respective distance of the respective illumination source;
    a luminaire type sensor arranged to detect a respective type of the respective illumination source; or
    a light sensor arranged to detect a respective light output of the respective illumination source.

11. The lighting system of claim 1, wherein said lighting scene is a static lighting scene.

12. The lighting system of claim 1, wherein said lighting scene is a dynamic lighting scene.

13. The lighting system of claim 12, wherein each illumination source is operable to transmit a central command to one or more neighbouring illumination sources to control the illumination properties of the one or more neighbouring illumination sources to generate the dynamic lighting scene.

14. A computer implemented method of rendering a lighting scene in an environment occupied by a user comprising:
    accessing data defining the lighting scene to be rendered;
    independently of the defining of said lighting scene, receiving at a controller data defining at least one point; and
    receiving a location of each respective one of an illumination source of a plurality of illumination sources relative to the least one point;
    receiving, from at least one of the illumination sources, at least one of an orientation of the at least one illumination source, a type of the at least one illumination source, and a distance of an effect surface of the lighting scene from the at least one illumination source;
    determining an effect location of an illumination effect from at least one illumination source of the plurality of illumination sources based on the received location, the detected distance and at least one of the received orientation and the luminaire type;
    rendering the lighting scene relative to said at least one point, by mapping the lighting scene to the illumination effect of a plurality of illumination sources in the environment to thereby adapt control commands from the controller to the illumination source based on illumination source location and illumination effect location of the illumination sources in the environment.

15. A non-transitory computer readable medium comprising instructions of a computer program product for controlling a lighting system to render a lighting scene in an environment occupied by a user, the computer program product configured so as when run on one or more control units of the lighting system to perform operations of:
  accessing data defining the lighting scene to be rendered;
  independently of the defining of said lighting scene, receiving at a controller data defining at least one point; and
  receiving a location of each respective one of an illumination source of a plurality of illumination sources relative to the least one point;
  receiving, from at least one of the illumination sources, at least one of an orientation of the at least one illumination source, a type of the at least one illumination source, and a distance of an effect surface of the lighting scene from the at least one illumination source;
  determining an effect location of an illumination effect from at least one illumination source of the plurality of illumination sources based on the received location, the detected distance and at least one of the received orientation and the luminaire type;
  rendering the lighting scene relative to said at least one point, by mapping the lighting scene to the illumination effect of a plurality of illumination sources in the environment to thereby adapt control commands from the controller to the illumination source based on illumination source location and illumination effect location of the illumination sources in the environment.

* * * * *